(12) United States Patent
Holm et al.

(10) Patent No.: US 9,179,447 B2
(45) Date of Patent: Nov. 3, 2015

(54) ROUTING TRAFFIC TOWARDS A MOBILE NODE

(75) Inventors: Tomas Holm, Älvsjö (SE); Lars-Örjan Kling, Södertälje (SE); Andreas Cleverdal, Älvsjö (SE); Robert Skog, Hässelby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 138 days.

(21) Appl. No.: 13/980,339

(22) PCT Filed: Feb. 1, 2011

(86) PCT No.: PCT/EP2011/051412
§ 371 (c)(1),
(2), (4) Date: Jul. 18, 2013

(87) PCT Pub. No.: WO2012/103938
PCT Pub. Date: Aug. 9, 2012

(65) Prior Publication Data
US 2013/0301598 A1    Nov. 14, 2013

(51) Int. Cl.
*H04W 4/00* (2009.01)
*H04W 72/04* (2009.01)
(Continued)

(52) U.S. Cl.
CPC ......... *H04W 72/04* (2013.01); *H04L 29/12066* (2013.01); *H04L 29/12367* (2013.01);
(Continued)

(58) Field of Classification Search
CPC ..... H04W 72/04; H04W 4/005; H04W 80/04; H04L 29/12066; H04L 29/12367; H04L 29/12377; H04L 29/22547; H04L 29/12669; H04L 29/12905; H04L 61/1511; H04L 61/2514; H04L 61/2517; H04L 61/2582; H04L 61/6054
See application file for complete search history.

(56) References Cited

U.S. PATENT DOCUMENTS 6,687,252 B1 * 2/2004 Bertrand et al. .............. 370/401
7,738,432 B2 * 6/2010 Bhatt et al. ................... 370/338
(Continued)

FOREIGN PATENT DOCUMENTS

EP    1919168 A1    5/2008

OTHER PUBLICATIONS

International Search Report, PCT/EP2011/051412, Dec. 19, 2011.
(Continued)

*Primary Examiner* — Robert Wilson
(74) *Attorney, Agent, or Firm* — Myers Bigel Sibley & Sajovec, P.A.

(57) ABSTRACT

A method of allowing a data connection between a first node attached to a private IP network and a second node external to the private IP network and connected to a public IP network. The method comprises allocating a private network IP address, a hostname, and a service name to said first node, the service name associated with a service provided by the first node. A gateway allocates a unique public network side port number to the first node. A mapping between the private network IP address and public network side port is included in a connection table. Records are installed in a Domain Name System of the public IP network that include: a service record defining said hostname and public network side port number as the location for said service name; and an address record defining a public IP address of said gateway as the location for said hostname.

21 Claims, 5 Drawing Sheets

(51) Int. Cl.
*H04L 29/12* (2006.01)
*H04W 80/04* (2009.01)

(52) U.S. Cl.
CPC .... *H04L29/12377* (2013.01); *H04L 29/12547* (2013.01); *H04L 29/12669* (2013.01); *H04L 29/12905* (2013.01); *H04L 61/1511* (2013.01); *H04L 61/2514* (2013.01); *H04L 61/2517* (2013.01); *H04L 61/2582* (2013.01); *H04L 61/304* (2013.01); *H04L 61/6054* (2013.01); *H04W 4/005* (2013.01); *H04W 80/04* (2013.01)

(56) References Cited

U.S. PATENT DOCUMENTS

| | | | | |
|---|---|---|---|---|
| 2007/0140267 | A1* | 6/2007 | Yang | 370/401 |
| 2010/0094978 | A1 | 4/2010 | Runeson et al. | |
| 2011/0191467 | A1* | 8/2011 | Imbimbo et al. | 709/224 |
| 2013/0301598 | A1* | 11/2013 | Holm et al. | 370/329 |

OTHER PUBLICATIONS

Written Opinion of the International Searching Authority, PCT PCT/EP2011/051412, Dec. 19, 2011.
Written Opinion of the International Preliminary Examining Authority, PCT/EP2011/051412, Jan. 21, 2013.
Written Opinion of the International Preliminary Examining Authority, PCT/EP2011/051412, May 6, 2013.
International Preliminary Report on Patentability, PCT/EP2011/051412, Jun. 4, 2013.
3GPP TR 23.888 V1.0.0 (Jul. 2010), *Technical Report*; 3$^{rd}$ Generation Partnership Project; "Technical Specification Group Services and System Aspects"; System Improvements for Machine-Type Communications; (Release 10), 3GPP Standard; Mobile Competence Centre; 650, Route des Lucioles; F-06921 Sophia-Antipolis Cedex; France. Sep. 22, 2010, XP050442131, 80 pages.
Lin et al.: "IP connectivity for gateway GPRS support node"; IEEE Wireless Communications, IEEE Service Center, Piscataway, NJ; vol. 12, No. 1, Feb. 1, 2005, XP011127718, ISSN: 1536-1284, pp. 37-46.
D. Wing, CISCO: "Port Control Protocol (PCP); draft-ietf-pcp-base-03.txt", Port Control Protocol (PCP); PCP working group, Internet-Draft, Intended Status: Standards Track; Internet Society (ISOC) 4, Rue Des Falaises CH-1205 Geneva, Switzerland, No. 3, Jan. 19, 2011, XP015073584, pp. 1-49.
A. Gulbrandsen et al.; "A DNS RR for specifying the location of services (DSN SRV)", Network Working Group, Request for Comments: 2783; Obsoletes: 2052; Category: Standards Track. Feb. 1, 2000; XP-002331406; pp. 1-12.
Cheshire et al.; "NAT Port Mapping Protocol (NAT-PMP)", Document: draft-cheshire-natpmp-03.txt; Internet-Draft; Category: Standards Track; Apr. 16, 2008, IETF draft, XP15057465, 28 pages.

* cited by examiner

ROUTING TRAFFIC TOWARDS A MOBILE NODE

CROSS REFERENCE TO RELATED APPLICATION

This application is a 35 U.S.C. §371 national stage application of PCT International Application No. PCT/EP2011/051412, filed on 1 Feb. 2011, the disclosure and content of which is incorporated by reference herein in its entirety. The above-referenced PCT International Application was published in the English language as International Publication No. WO 2012/103938 A1 on 9 Aug. 2012.

TECHNICAL FIELD

The present invention relates to the routing of traffic towards a mobile node. It is applicable in particular to the case where the mobile node is located behind a Network Address Translator (NAT).

BACKGROUND

Currently implemented communication systems for mobile devices allow users to easily access data services in addition to the traditional telephony services. Commonly used data services include email and web browsing. These existing data services rely on the mobile device acting as client, with data being requested (either directly or by subscription to a relevant service) and subsequently pushed to the mobile device from a network server (based for example in the network operator's domain or in the wider Internet).

Machine-to-machine (M2M) refers to the exchange of information between devices substantially without the need for human intervention. Such communication may be facilitated by the data services offered by existing mobile communication networks. By way of an example, a domestic electricity meter may be coupled to a mobile device (with SIM card installed) in order to periodically send electricity meter readings to a central server of an electricity supply company, via a mobile communication network to which the mobile device has access. Such services work well where it is the device which initiates the communication. It may be difficult however to implement services which require the central server (or other remote point) to initiate the communication. Considering again the above example, this scenario might arise when a user detects a fault with his or her meter and reports this to the supply company, whereupon the supply company wishes to poll the user's home electricity meter to obtain various data therefrom.

In today's Internet, IPv4 address space is severely limited given that an IPv4 address is composed of 32 bits. Despite the standardisation of IPv6 with a much greater address space, legacy issues (particularly associated with Internet routers) mean that IPv4 remains dominant. Mobile network operators must therefore live with the constraints of IPv4. In particular, operators have had to find a way to allow the many millions of mobile users to access IP data services despite the fact that the operators themselves are allocated only a relatively small number of unique IPv4 addresses. This is generally achieved using a process known as Network Address Translation, whereby the mobile devices are located behind a Network Address Translator (NAT). Within the operator's domain, private IP addresses are used to identify connected mobile devices. These private IP addresses are unique only within the operator's domain. The NAT allocates external IP addresses and ports (from a pool of available addresses and ports) as and when required by mobile devices. Using 3GPP terminology, this IP address allocation will likely occur at Packet Data Protocol (PDP) context creation. Typically, multiple mobile devices will share a single external IP address. A mobile device will randomly select a so-called "ephemeral" port number from a range of available port numbers. This ephemeral port number is included as the source port number in outgoing packets for the mobile node, and as the destination port number in incoming packets destined for that mobile node. The NAT maintains a mapping between external IP addresses and port numbers on the one hand and private IP addresses and port numbers on the other. The NAT performs IP address and port number translation for incoming packets using this mapping. IP address and port number translation is also performed by the NAT for outgoing packets based upon this mapping.

A problem with NATing is that, as a mobile device does not have a permanently allocated external IP address and port number, it is generally not possible for an external device to initiate a communication session with the mobile device. The external IP address and port number mapped to a particular mobile node may even change between different PDP context creations. The NAT must reject all such externally initiated communications to avoid the risk of them being forwarded to the wrong mobile device. In some cases it may be possible for a mobile device to initiate and establish a connection with an intermediary server via the NAT, and to maintain that connection by regularly polling the server. An external peer device may then initiate a connection with the mobile device by routing a connection request via the intermediary node and through the already open "pinhole" in the NAT. This of course requires that an appropriate application be installed in the mobile device (and in the external peer device), and that signalling be exchanged between the mobile device and the intermediary server hosting the registration service each time the device is allocated a new external IP address and port number (in addition to the polling traffic).

US2010/0094978 describes a mechanism for interfacing a private network to a public network such as the Internet. This involves providing a node or nodes in the public network with a host identifier having a first part identifying a server agent interfacing the two networks and a second part identifying a server present in the local network. Using the first part of the host identifier, a node in the public network is able to obtain an IP address for the server agent (e.g. using a DNS lookup) and open a TCP connection to the server agent. The public network node then forwards a message, destined for the private network server, to the server agent. This message includes in it the relevant host identifier. The server agent listens to a well known port, e.g. 80, and receives connection requests on that port. The server agent uses the second part of the host identifier to forward the received message to the private network server. This approach is limited to those protocols such as HTTP which allow the hostname to be included within the message sent from the public network node to the private network server. It is not applicable to protocols that do not allow this such as SNMP, SSH, SMTP, LDAP as well as other proprietary protocols that run over IP.

SUMMARY

According to a first aspect of the present invention there is provided a method of allowing a data connection to be made between a first node attached to a private IP network and a second node external to the private IP network and connected to a public IP network. The method comprises allocating a private network IP address, a hostname, and a service name to said first node, the service name being associated with a service provided by the first node. At a gateway interconnecting said private and public IP networks, a unique public network side port number is allocated to the first node. A mapping between said private network IP address (and optionally the private network side port number) and said public network side port is included in a connection table. The following records are installed in a Domain Name System, DNS, of the public IP network:

- a service, SRV, record defining said hostname and public network side port number as the location for said service name, and
- an address, A, record defining a public IP address of said gateway as the location for said hostname.

Said second node is thereafter able to perform a DNS lookup in the public IP network in order to resolve said service name into a public IP address and port number and said gateway listens at said public side network port number for connection attempts to said first node.

Embodiments of the invention allow an external node to initiate a connection to a mobile node attached to a private IP network. The mobile node may function as a mobile server.

The private IP network may be enabled by a General Packet Radio Service, GPRS, network, the method comprising allocating a private network IP address to said first node at a GPRS Gateway Support Node, GGSN. In this case, said gateway allocates said unique public network side port number to the first node upon receipt of a trigger signal from said GGSN. More particularly, the GGSN sends the trigger signal to said gateway upon creation of a Packet Data Protocol, PDP, context for said first node in the GPRS network.

The mapping that is installed in the connection table may be a mapping between said private network IP address and a private network side port number on the one hand and said public network side port on the other.

According to a second aspect of the present invention there is provided a gateway for interconnecting a private and a public IP network to allow a data connection to be made between a first node attached to the private IP network and a second node external to the private IP network and connected to the public IP network. The apparatus comprises a port number allocator for allocating a unique public network side port number to the first node and for including, in a connection table, a mapping between a private network IP address of said first node and said public network side port number. The apparatus further comprises a Domain Name System, DNS, manager for installing in a DNS of the public IP network,

- a service, SRV, record defining a hostname and said public network side port number as the location for a service name associated with said first node, and
- an address, A, record defining a public IP address of the gateway as the location for said hostname, The apparatus further still comprises a traffic controller for receiving traffic at said unique public network side port number, for using said connection table to map said unique public network side port to said private IP address of said first node, and for forwarding said traffic to said first node over the private IP network using said private IP address.

Optionally, said mapping may also include the private network side port number of the first node, such that the traffic controller is able to determine both said private IP address and port number for the first node, and use these to forward traffic to the first node. Alternatively, where the port number used by the first node is a well known port number, the traffic controller may determine the private network side port number independently of the connection table.

According to a third aspect of the present invention there is provided a packet gateway node such as a GPRS Gateway Support Node, GGSN, or a Packet Data Network Gateway, PDN-GW. The node comprises a packet data protocol controller for establishing a packet data protocol, PDP, context for a mobile node within a private packet network, including allocating a private network IP address to the mobile node, and a notifier responsive to establishment of said PDP context to send a trigger signal to a gateway interconnecting the private packet network to a public IP network. The trigger signal informs the gateway of the PDP context establishment and contains said private network IP address and one or more identifiers of the mobile node.

According to a fourth aspect of the present invention there is provided a method of allowing a data connection to be made between a first node attached to a private IP network and a second node external to the private IP network and connected to a public IP network. The method comprises associating a private network IP address and a hostname to said first node and, at a gateway interconnecting said private and public IP networks, including in a connection table a mapping between said private network IP address and said hostname. An address, A, record defining a public IP address of said gateway as the location for said hostname is installed in a Domain Name System, DNS, of the public IP network. The method further comprises listening at a well known port number for a connection request from said second node including said hostname, and using said connection table to map the hostname to said private IP address. The connection request is forwarded to said first node over the private IP network using the private IP address. This allows said second node to perform a DNS lookup in the public IP network in order to resolve said hostname into said public IP address.

According to a fifth aspect of the present invention there is provided method of allowing a data connection to be made between a first node attached to a private IP network and a second node external to the private IP network and connected to a public IP network. The method comprises, at a packet gateway of a packet data network, detecting creation of a packet context for said first node and sending a trigger signal from the packet gateway to a Network Address Translator, NAT, interconnecting said private and public IP networks, the trigger signal containing at least one identifier of said first node. At the NAT, a hostname is created for or associated with said first node using said identifier, and a mapping between a private network IP address of the first node and said hostname added to a connection table. The mapping between said hostname and a public network IP address of the NAT is registered in a Domain Name System, DNS, of the public network.

DETAILED DESCRIPTION

As will be appreciated by the person of skill in the art, the conventional approach to NATing requires the maintenance within the NAT of a table mapping private IP addresses on the one hand with public IPv4 addresses and ephemeral port numbers on the other. Due to the relatively low numbers of public IPv4 addresses and ephemeral port numbers available to the NAT, the NAT will seek to reallocate unused public IPv4 address and ephemeral port number combinations. This makes it difficult to establish connections between a device located in a private network behind the NAT and an external device coupled to a public network such as the Internet, where it is the external device which initiates the connection. In such a scenario, the external device operates as the client, whilst it is the mobile device behind the NAT that operates as the server.

A first solution to this problem will now be discussed. It is assumed firstly that a mobile device is connected to a private IP network, where the private IP network forms part of a mobile service operator's domain. By way of example, the private network is implemented on top of a 3G General Packet Radio Service (GPRS). The mobile device offers a service at a local "well known" port (e.g. the Simple Network Management Protocol, SNMP, service at port 161, or http at port 80), and is referred to hereinbelow as a "mobile server". The offered service and local port are identified generically here as <service_x> and <port_x>. The mobile server is located behind an operator premises NAT. The NAT lies in the user plane and sits between the GPRS Gateway Support Node (GGSN) and the public Internet. Within the private network the mobile server is assigned a private IPv4 address, typically at the time that the mobile server connects to the GPRS service, i.e. at Packet Data Protocol (PDP) context creation.

The NAT function is included within a new network component referred to here as a "Mobile Device Service Internetifier" (MDSI). The MDSI uses information provided by the GGSN that is triggered by a PDP context creation. The information is sent using the Radius protocol and includes inter alia the MSISDN, IMSI, IMEI and the assigned private IP-address of the mobile server. Furthermore, the MDSI uses information that has been pre-provisioned in it, including the service(s) name and local port(s) that is provided by the mobile device.

Figure 1:
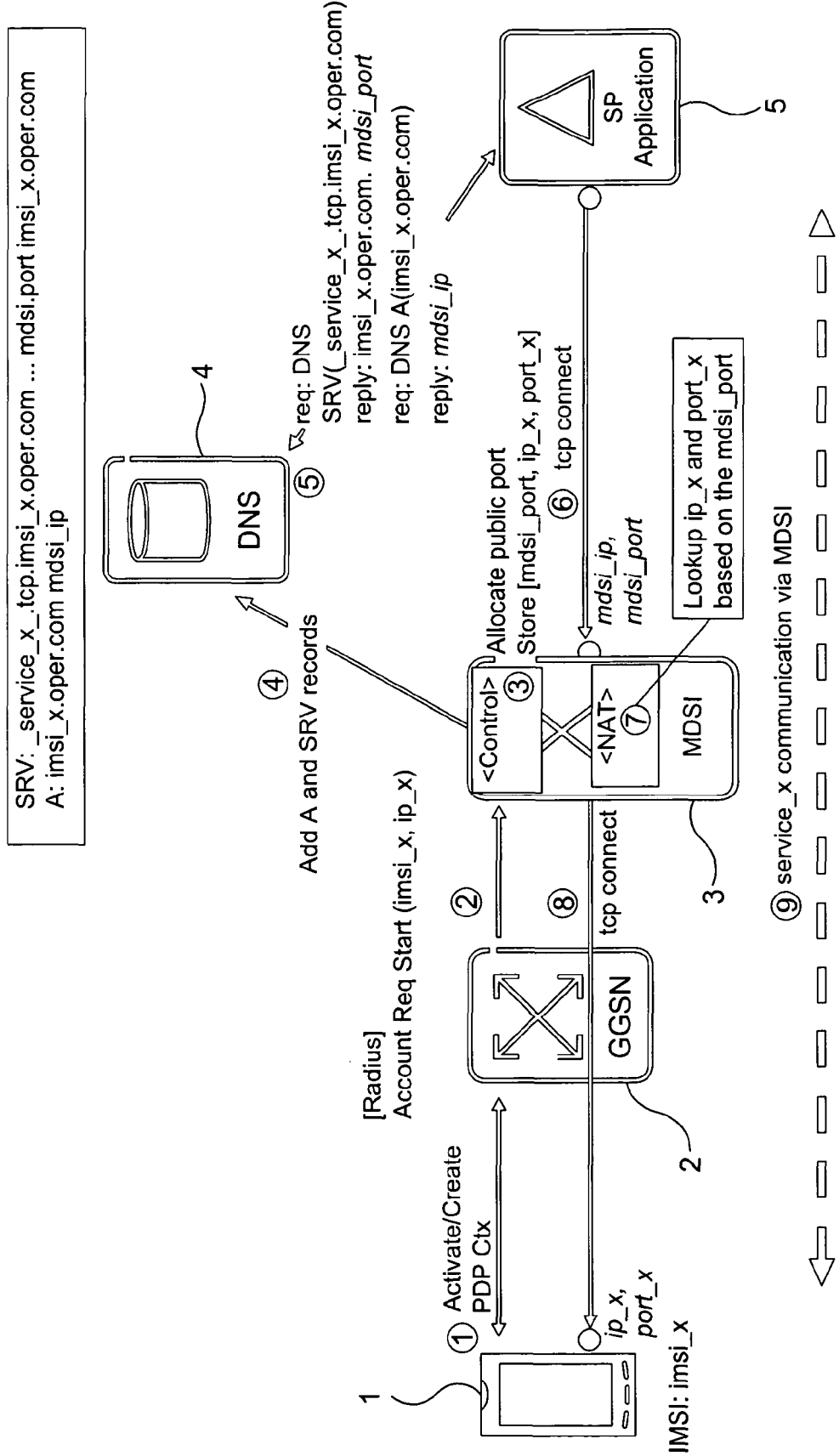
FIG. 1 illustrates schematically a network architecture for enabling public access to a mobile node within a private network according to a first embodiment.

This network architecture is illustrated schematically in FIG. 1, where the mobile server is identified by reference numeral 1, the GGSN by the reference numeral 2, and the MDSI (including NAT) by reference numeral 3. Also shown in the Figure are a Domain Name System (DNS) server 4 and an external, peer node 5. Although not shown in the Figure, the MDSI 3, DNS server 4, and peer node 5 are all coupled to the public Internet which facilitates communication between these components.

FIG. 1 also illustrates a number of steps in a procedure for firstly registering contact data for the mobile server in the DNS server, and secondly for allowing the peer node to initiate a connection with the mobile server. These steps are as follows, where the step numbers are as shown (encircled) in FIG. 1:

1. The mobile server creates a PDP context and is assigned a private IPv4 address ip_x.
2. The GGSN notifies the MDSI over the Radius protocol that a PDP context has been created, and passes to it the mobile server IMSI and private IPv4 address, i.e. imsi_x and ip_x (as well as any other required information).
3. The MDSI is pre-provisioned with the mobile device service name (service_x_.tcp.imsi_x.oper.com) and local port number (port_x). [Pre-provisioning can occur, for example, when the mobile subscription is provisioned in the Home Location Register (HLR).] The MDSI creates a listen socket associated with the mobile server and its offered service on a public port, i.e. mdsi_port. This is a so-called ephemeral port, i.e. not a well known port. The MDSI creates (or obtains in the case that the hostname is pre-provisioned) a mobile server hostname based on the imsi_x, i.e. imsi_x.operator.com, and stores the allocated MDSI public port, the mobile server private IPv4 address and local port, i.e. [mdsi_port, ip_x, port_x] in a connection table within a mapping database.
4. The MDSI then updates the DNS server with:
   a) an SRV-record: _service_x_.tcp.imsi_x.oper.com.... mdsi_port imsi_x.oper.com, and
   b) an A-record (or AAAA): imsi_x.operator.com, mdsi_ip This completes the DNS registration procedure for the mobile server. It will be appreciated that when the mobile server detaches from the GPRS network, the MDSI is notified by the GGSN and may request that the DNS remove the corresponding SRV and A records, at the same time as removing the associated mapping from the connection table. In the event that the private IP address allocated to the mobile server in the private network changes for any reason, the GGSN notifies the MDSI of the change, and the MDSI updates the mapping in the connection table. There is no need in this case for the MDSI to update the DNS (assuming that the allocated MDSI public port does not change).

The mobile server can now be contacted by the external peer node using standard DNS SRV and A (AAAA) lookups to resolve the public IP address and public port of the MDSI starting with the service name (known to the external peer node). In this example the peer node belongs to a service provider (SP) and runs an SP application for that service provider. It is assumed that the SP knows the service name of the service that it wishes to access. Connection involves the following steps:

5. The SP application at the peer node asks the DNS to resolve
   a) SRV(_service_x_.tcp.imsi_x.oper.com): the DNS replies to the peer node with imsi_x.operator.com and mdsi_port
   b) A(imsi_x.operator.com): the DNS replies to the peer node with mdsi_ip
6. The SP application connects to the mdsi_ip and port mdsi_port using TCP.
7. The MDSI looks up, using the connection table, the private IP address and local port number that correspond to the mdsi_port, i.e. ip_x and port_x.
8. The MDSI connects to ip_x and port_x again using TCP.
9. Service_x traffic is now exchanged between the mobile server and the SP application in the peer node, with intermediate forwarding by the MDSI. The MDSI performs NATing on this traffic, switching between the private IP address and local port number of the mobile server and the public address and allocated ephemeral port number of the MDSI as appropriate.

Multiple service names may be provisioned in the MDSI for the same mobile server. In this case, the MDSI must register a corresponding number of SRV records in the DNS server, one SRV record for each service name. Of course, the SRV records will likely point to different MDSI ports but the same hostname (with the hostname being resolved to a public IP address using a lookup to the same A record).

The procedures described above enable any device with a private IPv4 address to be identified by a hostname optionally derivable from device or SIM identifiers. They enable the DNS lookup of a public IP address where a device is reachable, even if the device does not have such an address permanently allocated to it. They further enable the introduction of business models and services where devices must be reached by Service Providers that do not own the devices. Furthermore, the procedures are applicable to a range of different protocols that can be used to exchange data over the established TCP (or UDP) connection. These include, for example, HTTP, SIP, LDAP, Diameter, Radius, SNMP, SMTP, and OMA-DM.

One example service already considered above is that offered by an electricity utility company, whereby the utility company can, as and when required, establish connections with "mobile" devices coupled to domestic (or business) electricity meters to obtain data from the meters. Another service might involve exchanging information concerning road conditions between devices installed in vehicles. Say for example sensors installed within a given vehicle detect that a road is slippery. In this case, a mobile device installed within that vehicle acts as a client, sending details of the road condition to a web server. The web server must then distribute the information on the road condition to devices installed in other vehicles. To do this it must initiate connections to the receiving devices. This can be done using the above procedure.

Figure 2:
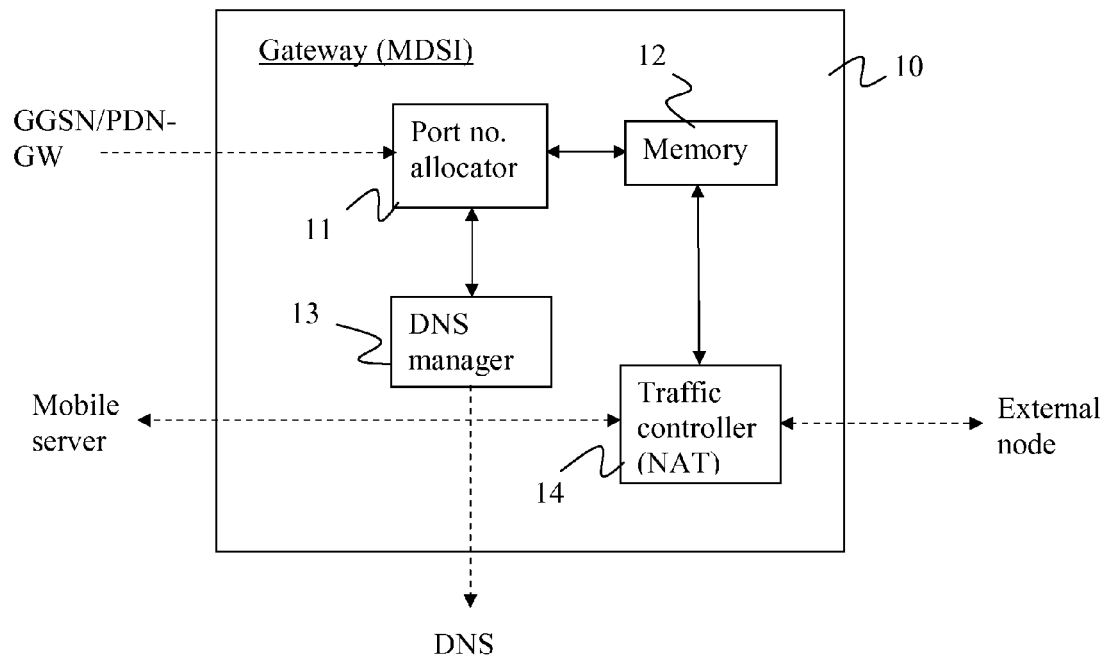
FIG. 2 illustrates schematically a gateway (NAT) of the network architecture of FIG. 1.

FIG. 2 illustrates schematically a gateway 10 for interconnecting the public and private IP networks. In the above example, this gateway is the MDSI and includes the NATing functionality. The gateway 10 is connected on the one side to the GGSN (or PDN-GW in the case of a LTE access network—see below). A "trigger" signal sent by the GGSN indicating PDP context creation for a given mobile server is received by a port number allocator 11 which is responsible for allocating a unique (ephemeral) external port number to the mobile server. The port number allocator 11 inserts a mapping into a connection table stored in a memory 12 as described above. The port number allocator also instructs a DNS manager 13 to install appropriate SRV and A records into the public DNS. A traffic controller 14 is configured to listen at the allocated external port for tcp connection requests. Traffic received on this port is forwarded to the mobile server based on the mapping held in the connection table.

Figure 3:
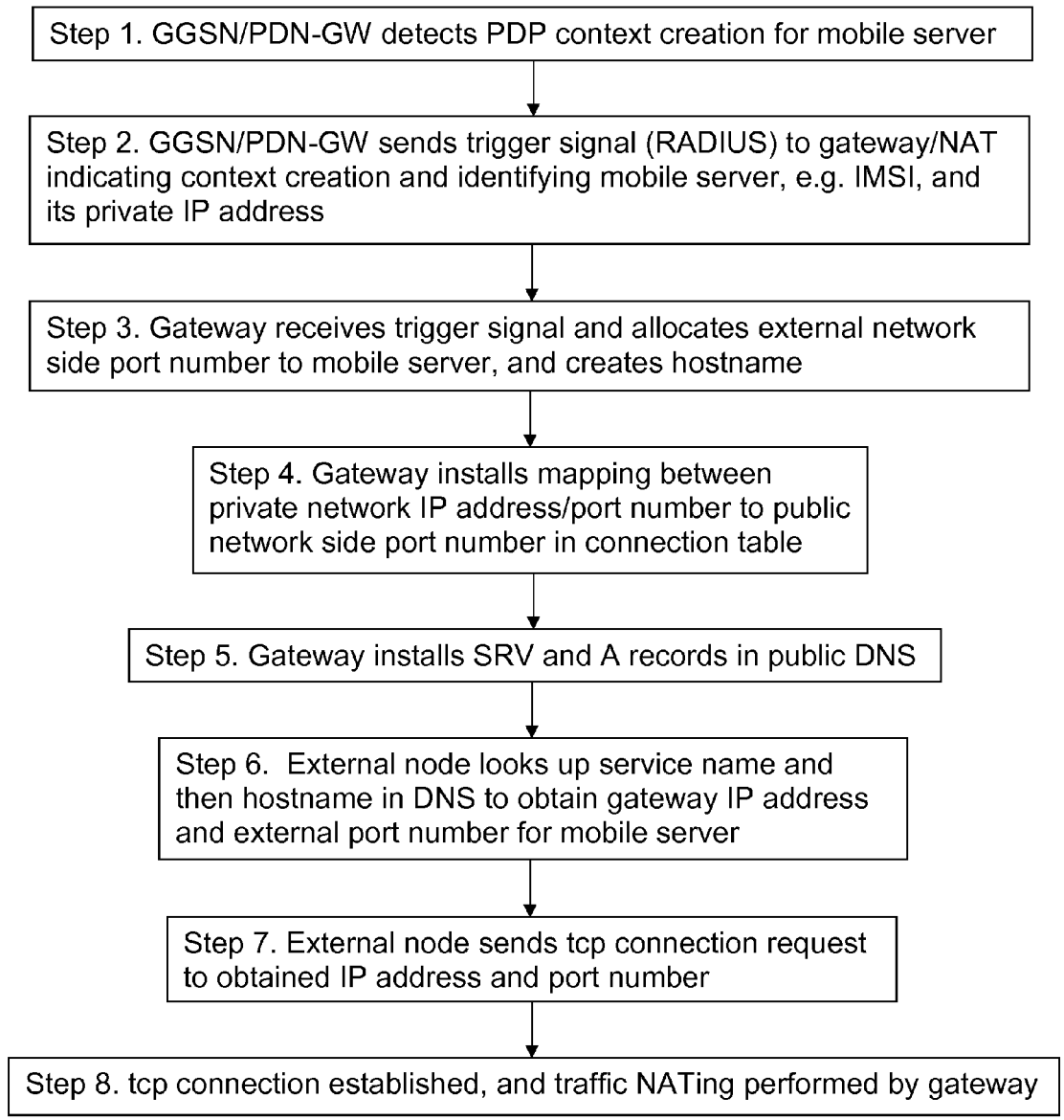
FIG. 3 is a flow diagram showing a method of publishing contact details for a mobile node in a public DNS and for utilising those details, according to the first embodiment.

FIG. 3 illustrates schematically a packet network gateway node 19 which may be, for example, a GGSN or a PDN-GW. The gateway node comprises a packet data protocol controller 20 for establishing a packet data protocol, PDP, context for a mobile node within a private packet network, including allocating a private network IP address to the mobile node. It further comprises a notifier 21 responsive to establishment of said PDP context to send a trigger signal to a gateway interconnecting the private packet network to a public IP network, the trigger signal informing the gateway of the PDP context establishment and containing said private network IP address and one or more identifiers of the mobile node.

Figure 4:
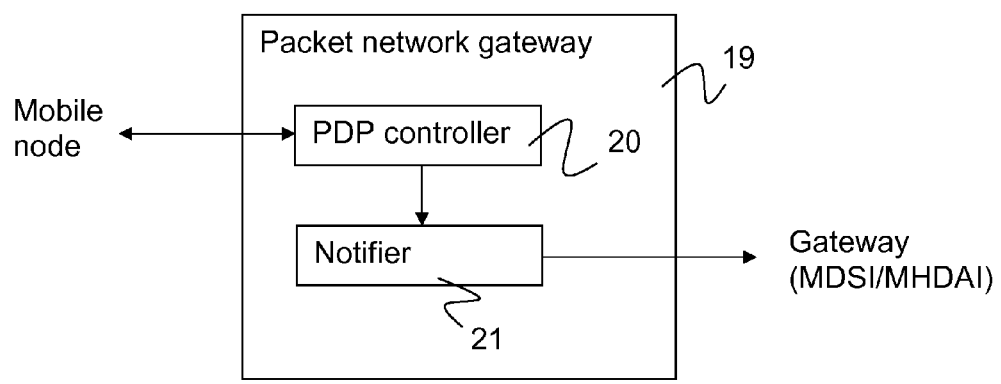
FIG. 4 illustrates schematically a packet network gateway of the network architecture of FIG. 1.

FIG. 4 is a flow diagram illustrating the key steps in the approach described above. At step 1, the GGSN (or PDN-GW) detects PDP context creation for a mobile server. At step 2, the GGSN sends a trigger signal to the gateway (e.g. MDSI) alerting the gateway to this context creation and identifying the mobile server and its allocated private network IP address. The gateway, at step 3, receives the trigger signal and allocates a unique external port number to the mobile server. At the same time, the gateway creates a hostname for the mobile server (it already knows the service name and the server port number). At step 4, the gateway creates the appropriate mapping (private network IP address and port number to external port number) in its connection table, and at step 5 installs the appropriate SRV (using the preconfigured service name) and A records into the public DNS. Then, at step 6, the external (SP) node looks up the service name in the DNS and obtains the public IP address of the gateway and the allocated external port number. At step 7, the external node sends a tcp (or UDP) connection request to the gateway using the received external IP address and port number. At step 8, the gateway begins NATing of traffic using the mapping contained in the connection table.

Figure 5:
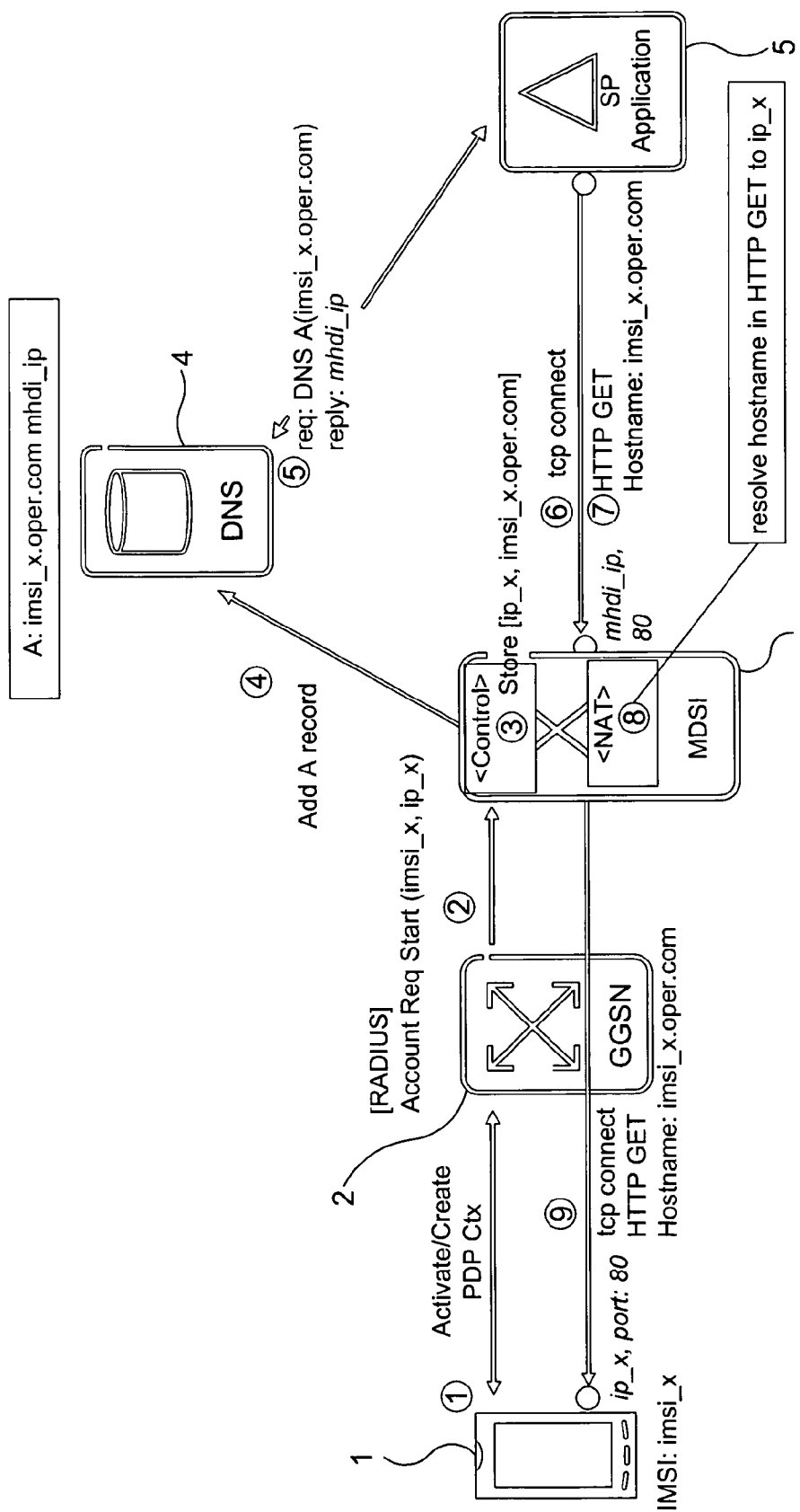
FIG. 5 illustrates schematically a network architecture for eabling public access to a mobile node within a private network according to a second embodiment.

An alternative approach to allowing an external node to initiate a communication with a mobile device (or mobile server) within a private network will now be considered, with reference to the architecture illustrated schematically in FIG. 5. According to this architecture, the MDSI of FIG. 1 is replaced with another new component referred to here as a "Mobile HTTP Device Automatic Internetifier" (MHDAI). As the name suggests, this architecture and the associated procedures are specific to the HTTP protocol. Nonetheless, given the widespread use of this protocol, the alternative architecture and procedures will cover a great many business model and service areas.

In FIG. 5, the mobile server and the GGSN are again identified by reference numerals 1 and 2 respectively, whilst the DNS server and external peer node are again identified by reference numerals 4 and 5 respectively. The MHDAI is identified by reference numeral 7. FIG. 2 illustrates various steps in the procedures for identifying the location mobile server 1 in the public Internet and for establishing a connection to the mobile server, with the steps being identified by the encircled reference numerals. Given the applicability of this approach to HTTP, it is assumed that the mobile server 1 offers an HTTP service.

The procedure for publishing contact details of the mobile server in the public network are as follows:
1. The mobile server creates a PDP context in the GPRS network and is assigned a private IPv4 address, ip_x.
2. The GGSN responds to this PDP context creation by notifying the MHDAI using the Radius protocol and passing to it the mobile server MSISDN, IMSI, IMEI and IP address, i.e. imsi_x, imei_x and ip_x.
3. The MHDAI stores the hostname (based on the imsi_x, i.e. imsi_x.operator.com) and the mobile device IP address, i.e. ip_x, in its connection table.
4. The MHDAI updates the DNS with an A-record that includes the hostname and the public IP address of the MHDAI: imsi_x.operator.com, MHDAI_ip At this point, the MHDAI is ready to receive connection requests on behalf of the mobile server, from external nodes. This process is as follows:
5. An SP application installed in the peer node asks the DNS to resolve the hostname imsi_x.operator.com: the DNS replies with MHDAI_ip.
6. The SP application connects to the MHDAI_ip using TCP.
7. The SP application sends an HTTP GET containing the Host header imsi_x.operator.com, to the MHDAI.
8. The MHDAI parses out the hostname header from the GET and applies hostname based forwarding, i.e. it resolves imsi_x.operator.com to ip_x.
9. The MHDAI forwards the HTTP GET to ip_x, i.e. the mobile server.

Figure 6:
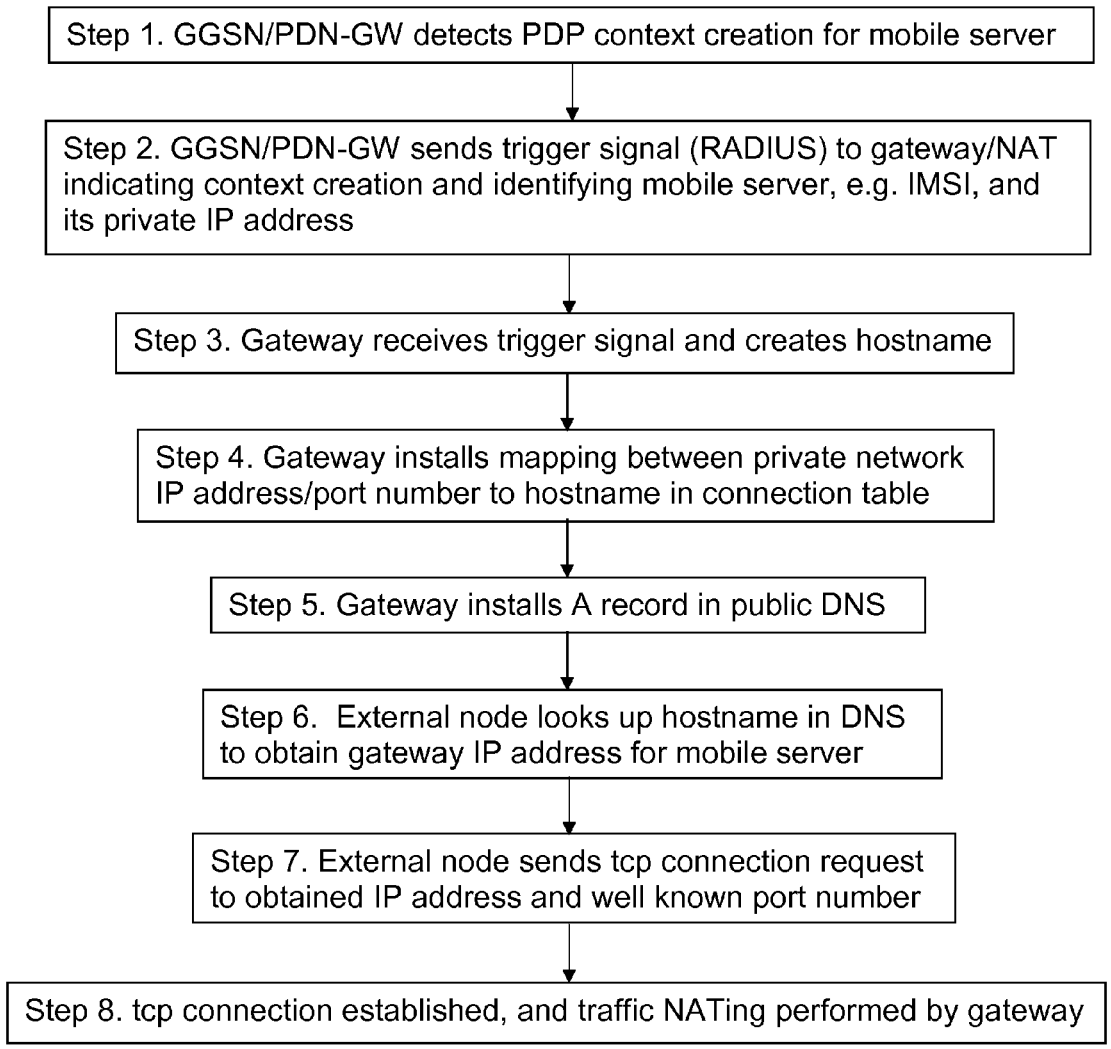
FIG. 6 is a flow diagram showing a method of publishing contact details for a mobile node in a public DNS and for utilising those details, according to the second embodiment.

FIG. 6 is a flow diagram further illustrating this alternative approach. The key steps illustrate are:
Step 1. The packet network gateway (e.g. in this example the GGSN or PDN-GW) detects PDP context creation for the mobile server.
Step 2. The GGSN or PDN-GW sends a trigger signal (RADIUS) to the gateway/NAT indicating context creation and identifying the mobile server, e.g. using the IMSI, and its private IP address.
Step 3. The gateway receives the trigger signal and creates (or obtains) a hostname.
Step 4. The gateway installs a mapping between the private network IP address and port number and the hostname in the connection table.
Step 5. The gateway installs an A record in the public DNS.
Step 6. An external node looks up the hostname in the DNS to obtain the gateway IP address for the mobile server
Step 7. The external node then sends a tcp connection request to the obtained IP address, and includes as destination port number a well known port number, e.g. 80.
Step 8. A tcp connection is established between the external node and the gateway, whereupon the external node sends an http connection request to the gateway over the tcp connection. Thereafter, traffic NATing is performed by the gateway.

Whilst the approach of FIGS. 5 and 6 is described with respect to the HTTP protocol, it will be appreciated that it may also be applicable to scenarios where other protocols are used to establish a session, provided that those other protocols are able to carry the hostname. One such alternative protocol is SIP.

It will be appreciated by the person of skill in the art that various modifications may be made to the above-described embodiments without departing from the scope of the present invention. For example, whilst the approaches described above have been concerned with a private network utilising IPv4 addressing, the approaches may be modified to fit the case where the private network uses IPv6 addresses. In this case, the NATing function performed within the MDSI and described above is replaced with a so-called NAT6 to 4 function. The approach is also applicable to network technologies other than 3G/GPRS. For example, in the case of 4G network technologies utilising Long Term Evolution (LTE) packet access, it may be the Packet Data Network Gateway (PDN-GW) that implements the functionality of the GGSN, namely to signal to the MDSI/MHDAI upon PDP context creation, identifying the user associated with the PDP context.

The invention claimed is:

1. A method of allowing a data connection to be made between a mobile node attached to a private IP network and a node external to the private IP network and connected to a public IP network, the method comprising:
    allocating a private network IP address, a hostname, and a service name to said mobile node, the service name being associated with a service provided by the first node;
    at a gateway interconnecting said private and public IP networks, allocating a unique public network side port number to the mobile node and including, in a connection table, a mapping between said private network IP address and said public network side port; and
    installing in a Domain Name System, DNS, of the public IP network,
        a service, SRV, record defining said hostname and public network side port number as the location for said service name, and
        an address, A, record defining a public IP address of said gateway as the location for said hostname,
    wherein said node external to the private IP network is able to perform a DNS lookup in the public IP network in order to resolve said service name into a public IP address and port number and said gateway listens at said public side network port number for connection attempts to said mobile node.

2. The method according to claim 1, wherein said private IP network is enabled by a General Packet Radio Service, GPRS, network, the method comprising allocating a private network IP address to said mobile node at a GPRS Gateway Support Node, GGSN.

3. The method according to claim 2, wherein said gateway allocates said unique public network side port number to the mobile node upon receipt of a trigger signal from said GGSN.

4. The method according to claim 3, wherein the GGSN sends the trigger signal to said gateway upon creation of a Packet Data Protocol, PDP, context for said mobile node in the GPRS network.

5. The method according to claim 4 further comprising including in the trigger signal sent by the GGSN, one or more identifiers of said mobile node.

6. The method according to claim 5, wherein said trigger signal comprises one or more of:
    a Mobile Subscriber ISDN number, MSISDN;
    an International Mobile Subscriber Identity, IMSI; and
    an International Mobile Equipment Identity, IMEI.

7. The method according to claim 5, further comprising allocating said service name and said hostname to said mobile node at said gateway, said service name and said hostname being constructed using the whole or a part of an identifier contained in said trigger signal.

8. The method according to claim 1, further comprising, at said gateway, performing Network Address Translation, NAT, on packets subsequently exchanged between said mobile node and node external to the private IP network to translate between said public and private IP addresses.

9. The method according to claim 1, wherein said private IP network is enabled by a Long Term Evolution, LTE, network, the method further comprising allocating a private network IP address to said mobile node at a Packet Data Network Gateway, PDN-GW, and said gateway allocates said unique public network side port number to the mobile node upon receipt of a trigger signal from said PDN-GW.

10. The method according to claim 1, further comprising allocating a plurality of service names to said mobile node, each said service name being associated with a different service, the method further comprising installing in said DNS an SRV record for each service name.

11. The method according to claim 1, wherein said mapping is a mapping between said private network IP address and a private network side port number on the one hand and said public network side port on the other.

12. A method of allowing a data connection to be made between a mobile node attached to a private IP network and a node external to the private IP network and connected to a public IP network, the method comprising:
    associating a private network IP address and a hostname to said mobile node;
    at a gateway interconnecting said private and public IP networks, including in a connection table a mapping between said private network IP address and said hostname;

installing in a Domain Name System, DNS, of the public IP network, an address, A, record defining a public IP address of said gateway as the location for said hostname;

listening at a well known port number for a connection request from said node external to the private IP network including said hostname, and using said connection table to map the hostname to said private IP address; and forwarding the connection request to said mobile node over the private IP network using the private IP address, wherein said node external to the private IP network is able to perform a DNS lookup in the public IP network in order to resolve said hostname into said public IP address.

13. The method according to claim 12, wherein said private IP network is enabled by a General Packet Radio Service, GPRS, network, the method further comprising allocating a private network IP address to said mobile node at a GPRS Gateway Support Node, GGSN, the GGSN sending the trigger signal to said gateway upon creation of a Packet Data Protocol, PDP, context for said mobile node in the GPRS network, and said gateway allocating said unique public network side port number to the mobile node upon receipt of a trigger signal from said GGSN.

14. The method according to claim 13 further comprising including in the trigger signal sent by the GGSN, one or more identifiers of said mobile node, where the identifier may be one of:
a Mobile Subscriber ISDN number, MSISDN;
an International Mobile Subscriber Identity, IMSI; and
an International Mobile Equipment Identity, IMEI.

15. The method according to claim 13, further comprising, at said gateway, performing Network Address Translation, NAT, on packets subsequently exchanged between said mobile node and node external to the private IP network to translate between said public and private IP addresses.

16. The method according to claim 12, wherein said private IP network is enabled by a Long Term Evolution, LTE, network.

17. The method according to claim 12, wherein said mapping is a mapping between said private network IP address and a private network side port number on the one hand and said public network side port on the other.

18. A method of allowing a data connection to be made between a mobile node attached to a private IP network and a node external to the private IP network and connected to a public IP network, the method comprising:
at a packet gateway of a packet data network, detecting creation of a packet context for said mobile node;
sending a trigger signal from the packet gateway to a Network Address Translator, NAT, interconnecting said private and public IP networks, the trigger signal containing at least one identifier of said mobile node;
at the NAT, creating or associating a hostname for or with said mobile node using said identifier, adding a mapping between a private network IP address of the mobile node and said hostname to a connection table, and registering a mapping between said hostname and a public network IP address of the NAT in a Domain Name System, DNS, of the public network.

19. The method according to claim 18, wherein said packet gateway is one of a GGSN and a PDN-GW.

20. The method according to claim 18, wherein said identifier is one of:
a Mobile Subscriber ISDN number, MSISDN;
an International Mobile Subscriber Identity, IMSI; and
an International Mobile Equipment Identity, IMEI.

21. The method according to claim 18, wherein said step of creating or associating a hostname comprises concatenating said identifier with a private network operator domain name.

* * * * *